(12) United States Patent
Fliearman et al.

(10) Patent No.: US 11,015,662 B2
(45) Date of Patent: May 25, 2021

(54) SPEED SENSOR FOR CLUTCH ASSEMBLY

(71) Applicant: Deere & Company, Moline, IL (US)

(72) Inventors: Steven R. Fliearman, Coffeyville, KS (US); Jeffrey S. Turner, Coffeyville, KS (US); Austin B. Stephens, Coffeyville, KS (US); Kevin M. Allen, Coffeyville, KS (US); Jacob E. Morris, Oologah, OK (US)

(73) Assignee: DEERE & COMPANY, Moline, IL (US)

( * ) Notice: Subject to any disclaimer, the term of this patent is extended or adjusted under 35 U.S.C. 154(b) by 103 days.

(21) Appl. No.: 16/516,521

(22) Filed: Jul. 19, 2019

(65) Prior Publication Data

US 2021/0018051 A1    Jan. 21, 2021

(51) Int. Cl.
| | |
|---|---|
| *F16D 27/115* | (2006.01) |
| *F16D 11/14* | (2006.01) |
| *F16D 25/0638* | (2006.01) |
| *F16D 27/00* | (2006.01) |
| *F16H 48/22* | (2006.01) |

(52) U.S. Cl.
CPC ............ *F16D 27/115* (2013.01); *F16D 11/14* (2013.01); *F16D 25/0638* (2013.01); *F16D 27/004* (2013.01); *F16H 48/22* (2013.01); *F16D 2300/18* (2013.01); *F16D 2300/26* (2013.01); *F16D 2500/1045* (2013.01);
(Continued)

(58) Field of Classification Search
CPC ...... F16D 27/004; F16D 27/115; F16D 11/14; F16D 25/0638; F16D 2300/18; F16D 2300/26; F16D 2500/1045; F16D 2500/30415; F16D 2500/30426; F16D 2500/30812; F16H 48/22
See application file for complete search history.

(56) References Cited

U.S. PATENT DOCUMENTS

| | | | | | |
|---|---|---|---|---|---|
| 3,914,033 | A | * | 10/1975 | Iwai ....................... | G03B 15/08 352/87 |
| 5,450,934 | A | * | 9/1995 | Maucher ............... | F16D 13/585 192/70.252 |

(Continued)

FOREIGN PATENT DOCUMENTS

| | | |
|---|---|---|
| DE | 69614737 T2 | 6/2002 |
| JP | H0821847 A | 1/1996 |

OTHER PUBLICATIONS

Search Report issued by the German Patent Office for Application No. 102020208303.7 dated Mar. 22, 2021 (4 pages including statement of relevance).

*Primary Examiner* — Tinh Dang
(74) *Attorney, Agent, or Firm* — Michael Best & Friedrich LLP (57) ABSTRACT

A clutch assembly includes a housing, a rotational member configured to rotate relative to the housing about an axis, and a clutch pack coupled between the housing and the rotational member. The clutch pack is configured to regulate movement of the rotational member relative to the housing. The clutch pack includes a speed sensor ring coupled to the rotational member such that the speed sensor ring is configured to rotate with the rotational member about the axis. The clutch assembly includes a sensor in communication with the speed sensor ring. The sensor is configured to measure an angular velocity of the rotational member relative to the housing.

20 Claims, 6 Drawing Sheets

(52) U.S. Cl.
CPC .............. *F16D 2500/30415* (2013.01); *F16D 2500/30426* (2013.01); *F16D 2500/30812* (2013.01)

(56) References Cited

U.S. PATENT DOCUMENTS

| | | | |
|---|---|---|---|
| 8,770,366 B2 * | 7/2014 | Dussel | F16D 13/757 192/48.91 |
| 2020/0018332 A1 | 1/2020 | Malloy | |

* cited by examiner

SPEED SENSOR FOR CLUTCH ASSEMBLY

FIELD OF THE DISCLOSURE

The present disclosure relates to a clutch assembly including a clutch pack, and more particularly to a speed sensor for the clutch assembly.

SUMMARY

In one aspect, a clutch assembly includes a housing, a rotational member configured to rotate relative to the housing about an axis, and a clutch pack coupled between the housing and the rotational member. The clutch pack includes a separator disk coupled to the housing such that the separator disk is fixed from moving about the axis relative to the housing, a friction disk coupled to the rotational member such that the friction disk is configured to move with the rotational member about the axis, and a speed sensor ring coupled to the rotational member such that the speed sensor ring is configured to rotate with the rotational member about the axis. The clutch assembly includes a sensor coupled to the housing. The sensor is in communication with the speed sensor ring and configured to measure an angular velocity of the rotational member relative to the housing. The friction disk, the separator disk, and the speed sensor ring are configured to axially move along the axis to regulate movement of the rotational member relative to the housing.

In another aspect, a clutch assembly includes a housing, a rotational member configured to rotate relative to the housing about an axis, and a clutch pack coupled between the housing and the rotational member. The clutch pack is configured to regulate movement of the rotational member relative to the housing. The clutch pack includes a speed sensor ring coupled to the rotational member such that the speed sensor ring is configured to rotate with the rotational member about the axis. The clutch assembly includes a sensor in communication with the speed sensor ring. The sensor is configured to measure an angular velocity of the rotational member relative to the housing.

In yet another aspect, a clutch assembly includes a housing, a rotational member configured to rotate relative to the housing about an axis, and a clutch pack coupled between the housing and the rotational member. The clutch pack includes a disk coupled to the housing. The disk includes a first maximum width parallel to the axis. The clutch pack also includes a speed sensor ring coupled to the rotational member such that the speed sensor ring is configured to rotate with the rotational member about the axis. The speed sensor ring includes a second maximum width parallel to the axis. The clutch assembly includes a sensor in communication with the speed sensor ring. The sensor is configured to measure an angular velocity of the rotational member relative to the housing. A ratio of the second width over the first width is greater than 1.5.

In addition, other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of supporting other embodiments and being practiced or being carried out in various ways. Also, it is to be understood that the phraseology and terminology used herein is for the purpose of description and should not be regarded as limiting. Terms of degree, such as "substantially," "about," "approximately," etc. are understood by those of ordinary skill to refer to reasonable ranges outside of the given value, for example, general tolerances associated with manufacturing, assembly, and use of the described embodiments.

Figure 1:
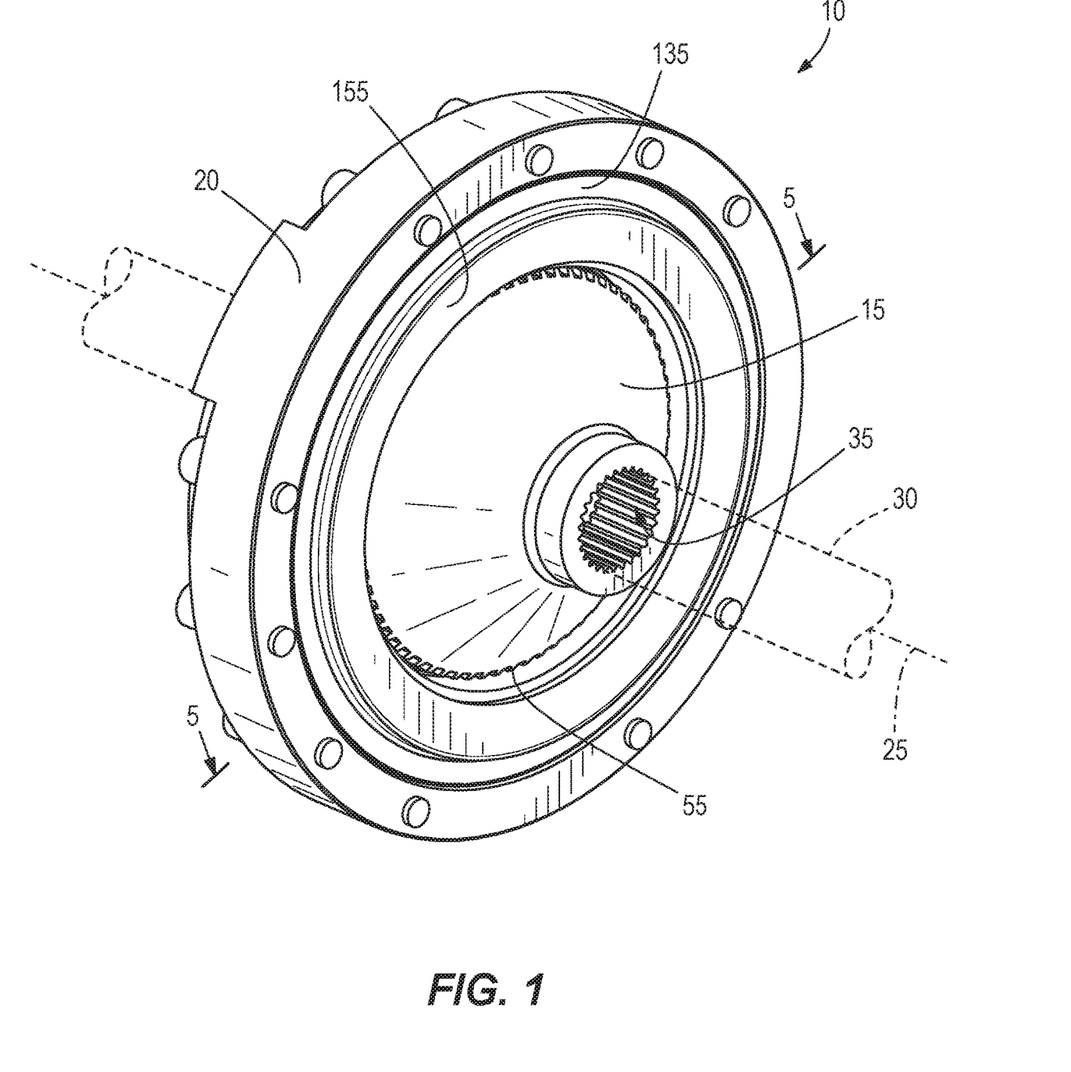
FIG. 1 is a perspective view of a clutch assembly.

FIG. 1 illustrates a clutch assembly 10 including a spindle 15 (e.g., a rotational member) rotatably coupled to a housing 20 about an axis 25. The illustrated clutch assembly 10 is operable as a braking system for a vehicle (e.g., an agricultural tractor, etc.), a mobile implement (e.g., a trailer, an agricultural baler, an agricultural liquid applicator, a haulage device, etc.) that is pulled or pushed by the vehicle, and/or a mobile implement that is self-driven, etc. Accordingly, the housing 20 is fixed to a structure (e.g., a frame of the vehicle/mobile implement) to support the clutch assembly 10 to the vehicle/mobile implement. An axle shaft 30 (e.g., of the vehicle, the mobile implement, etc.) extends through a central splined aperture 35 of the spindle 15 and is operable to drive a wheel, a track, etc. that is coupled to an end of the axle shaft 30 with a power source (e.g., engine, motor, transmission, etc.) coupled to the other end of the axle shaft 30. As such, the clutch assembly 10 is operable to reduce an angular velocity of the axle shaft 30 to brake the vehicle, the mobile implement, etc.

Figure 2:
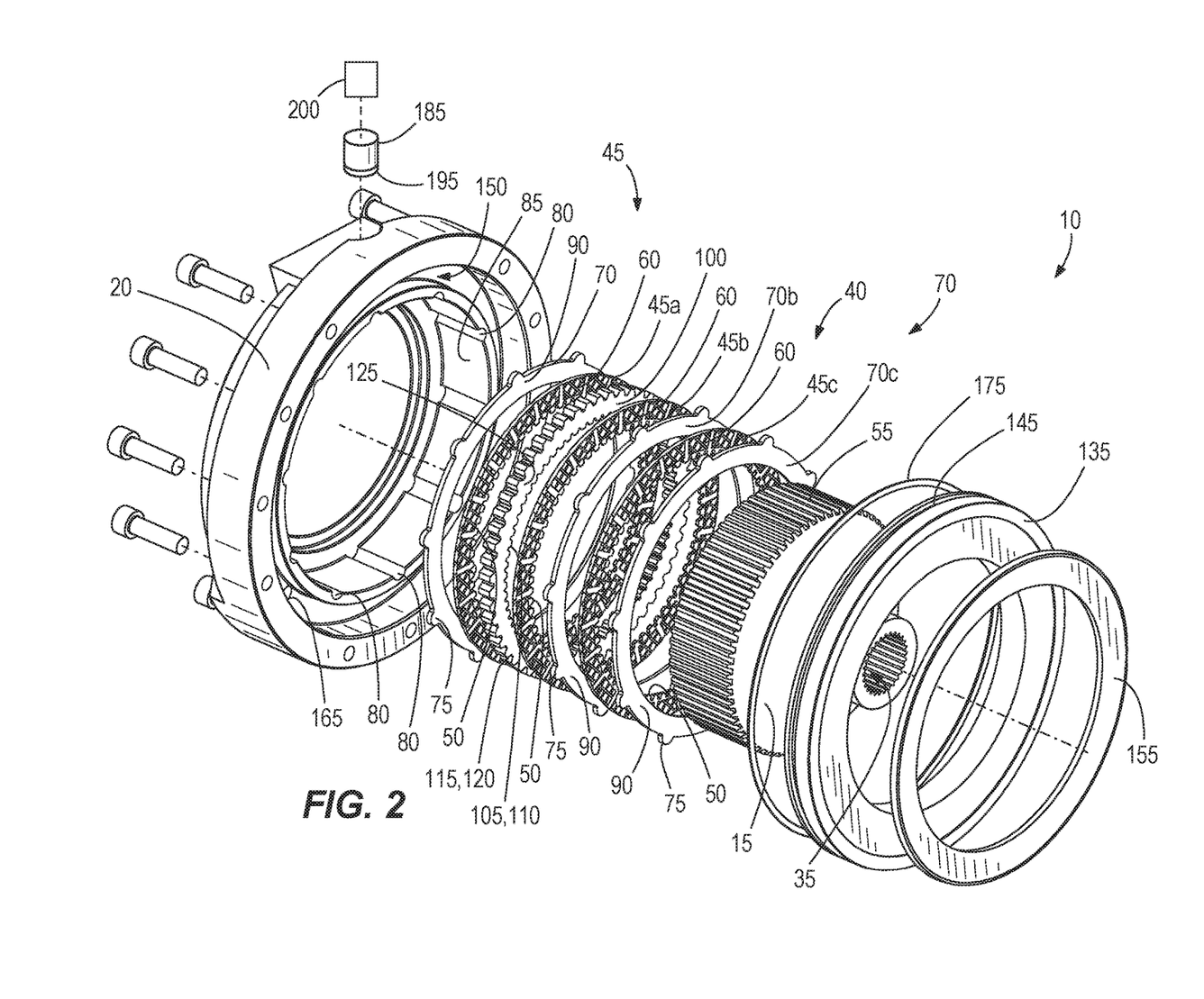
FIG. 2 is a first exploded view of the clutch assembly of FIG. 1, the clutch assembly including a clutch pack including a speed sensor ring according to one embodiment of the disclosure.
Figure 3:
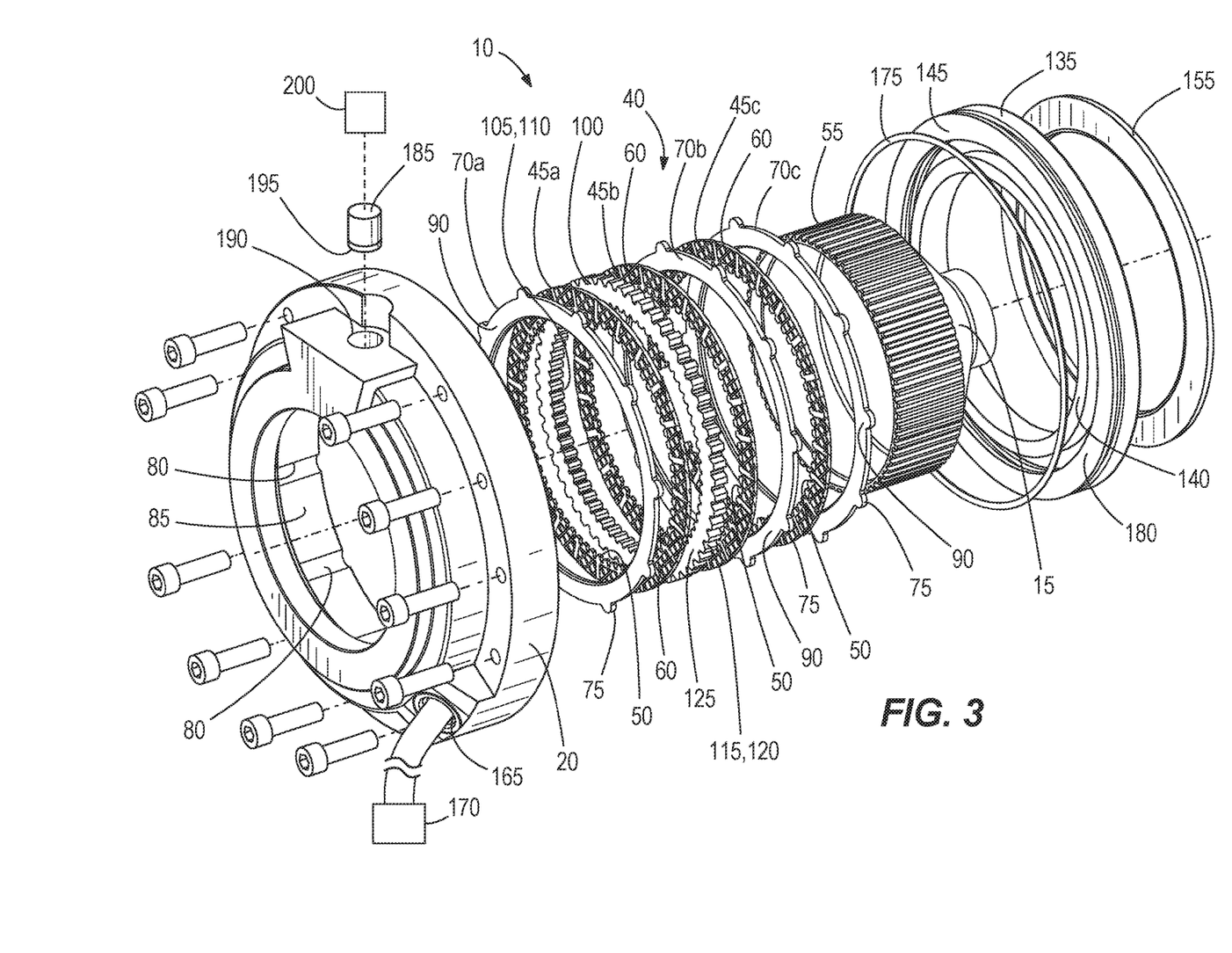
FIG. 3 is a second exploded view of the clutch assembly of FIG. 1.

With reference to FIGS. 2 and 3, the clutch assembly 10 includes a clutch pack 40 coupled between the housing 20 and the spindle 15. The clutch pack 40 includes friction disks 45 having teeth 50 formed on an inner periphery of the friction disks 45 that enmesh with teeth 55 formed on an outer periphery of the spindle 15 such that the friction disks 45 move with the spindle 15 about the axis 25. The engagement between the friction disks 45 and the spindle 15 via the teeth 50, 55 also allows the friction disks 45 axially movement along the axis 25 relative to the spindle 15 and the housing 20. Each friction disk 45 includes two opposing side surfaces 60 having a material with a relatively high coefficient of friction (e.g., a ceramic material, etc.). In addition, each friction disk 45 includes a first width 65 (FIG. 5)—measured in a direction along the axis 25—between the two opposing side surfaces 60 (e.g., the maximum width of each friction disk 45).

The clutch pack 40 also includes separator disks 70 having projections 75 formed on an outer periphery of the separator disks 70 that are received within grooves 80 formed on an inner surface 85 of the housing 20 such that the separator disks 70 are fixed from rotating about the axis 25 relative to the housing 20. However, the engagement between the separator disks 70 and the housing 20 allows the separator disks 70 axially movement along the axis 25 relative to the housing 20 and the spindle 15. Each separator disk 70 includes two opposing side surfaces 90 having a material with a lower coefficient of friction than the friction disks 45 (e.g., a metallic material such as steel, etc.). In addition, each separator disk 70 includes a second width 95 (FIG. 5)—measured in the direction along the axis 25—between the two opposing side surfaces 905 (e.g., the maximum width of each separator disk 70). In the illustrated embodiment, the second width 95 of the separator disks 70 is substantially the same as the first width 65 of the friction disks 45. In other embodiments, however, the second width 95 of the separator disks 70 may be greater than or less than the first width 65 of the friction disks 45.

The clutch pack 40 further includes a speed sensor ring 100 having teeth 105 formed on an inner periphery 110 of the speed sensor ring 100 that enmesh with the teeth 55 of the spindle 15. Like the friction disks 45, the speed sensor ring 100 moves with the spindle 15 about the axis 25 and is allowed axially movement along the axis 25 relative to the spindle 15 and the housing 20. The speed sensor ring 100 also includes protrusions 115 formed on an outer periphery 120 of the speed sensor ring 100 and two opposing side surfaces 125 having a similar material to the separator disks 70. In addition, the speed sensor ring 100 includes a third width 130 (FIG. 5)—measured in the direction along the axis 25—between the two opposing side surfaces 125 (e.g., the maximum width of the speed sensor ring 100). The third width 130 is substantially greater than the first and second widths 65, 95. For example, a ratio of the third width 130 over the first width 65 or a ratio of the third width 130 over the second width 95 is between about 1.5 and about 10. In other embodiments, the ratio of the third width 130 over the first width 65 or the ratio of the third width 130 over the second width 95 is between about 2 and about 6. In further embodiments, the ratio of the third width 130 over the first width 65 or the ratio of the third width 130 over the second width 95 is between about 2 and about 4.

As shown in FIGS. 2 and 3, the clutch pack 40 includes three friction disks 45a, 45b, 45c and three separator disks 70a, 70b, 70c with the speed sensor ring 100 positioned between the friction disks 45a, 45b. In other embodiments, the clutch pack 40 can be differently configured. For example, the clutch pack 40 can include more or less than three friction disks 45 and/or more or less than three separator disks 70, and/or the separator disks 70 can be coupled to the spindle 15 for rotational movement therewith and the friction disks 45 can be coupled to the housing 20.

Figure 4:
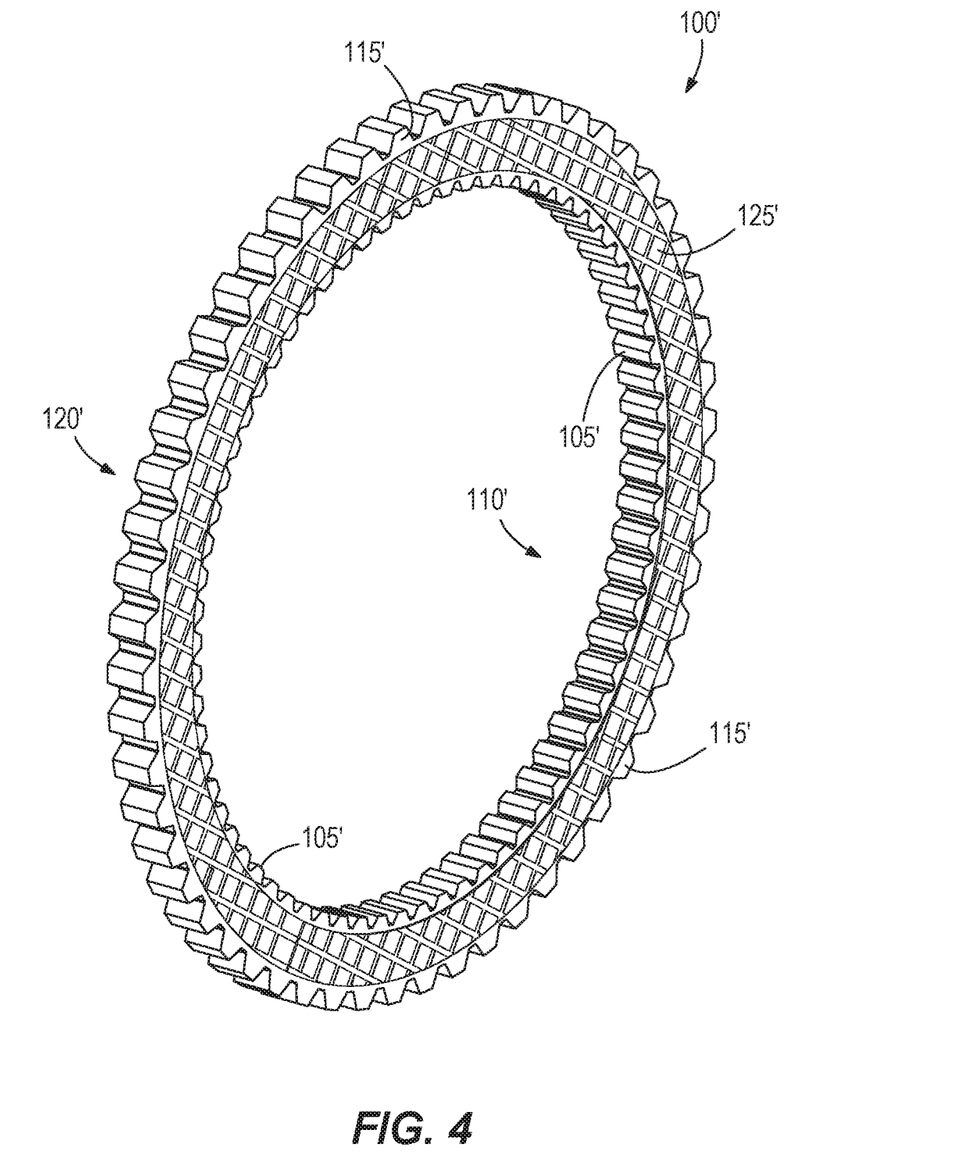
FIG. 4 is a perspective view of a speed sensor ring of the clutch assembly of FIG. 1 according to another embodiment of the disclosure.

In further embodiments, the speed sensor ring 100 can be made as one integral component with the friction disks 45a, 45b—as shown in FIG. 4 as a speed sensor ring 100' including teeth 105' formed on an inner periphery 110' and protrusions 115' formed on an outer periphery 120'. In one embodiment, the speed sensor ring 100' includes a base material similar to the friction disks 45 with the teeth 105' and the protrusions 115' subsequently formed (e.g., by a machining process, etc.). Accordingly, side surfaces 125' of the speed sensor ring 100' have a similar material to the friction disks 45. In yet further embodiments, the friction disks 45a, 45b can be coupled (e.g., bonded, fastened, etc.) to the speed sensor ring 100 such that the friction disks 45a, 45b are fixed to the speed sensor ring 100 for movement therewith.

Figure 5:
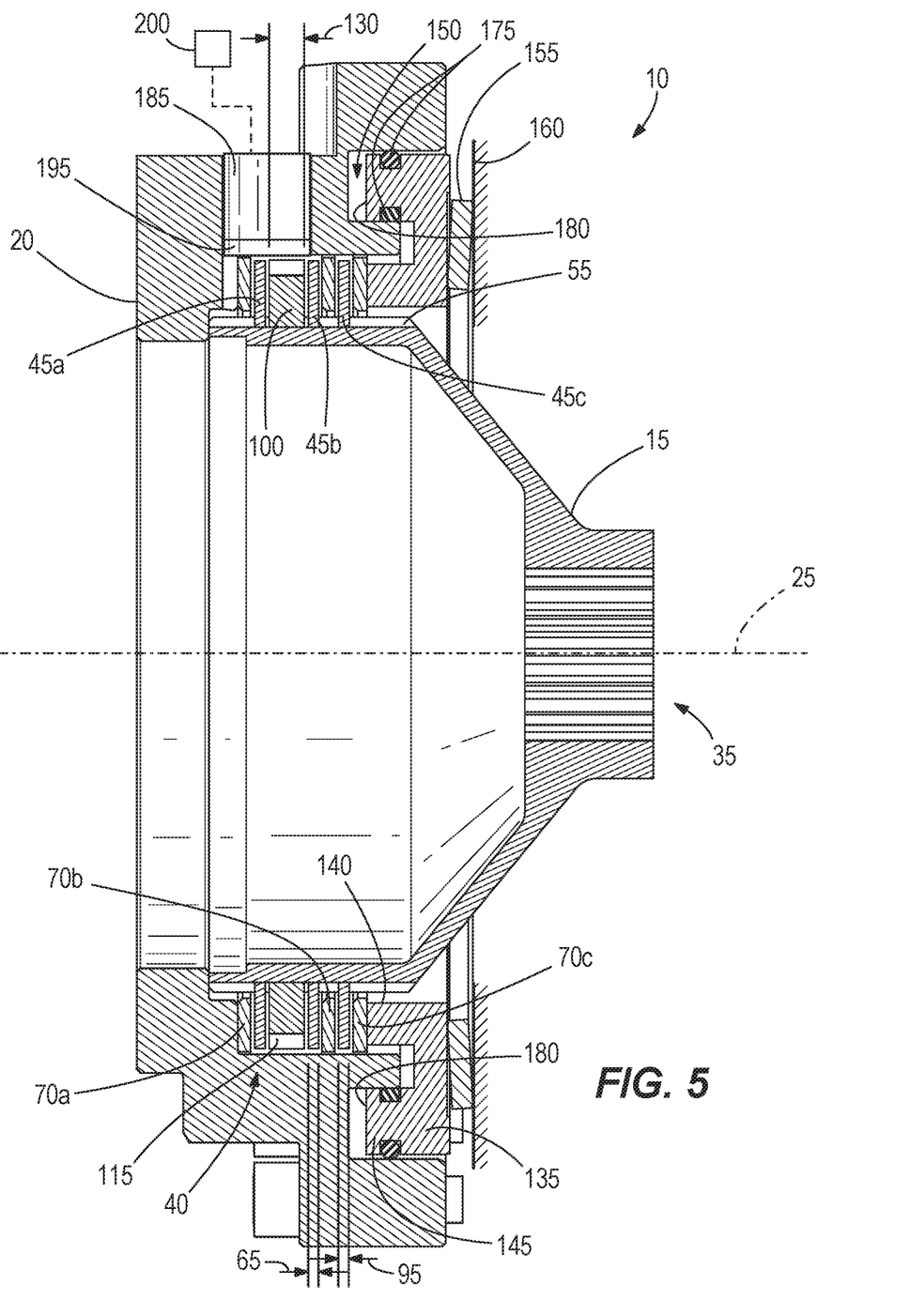
FIG. 5 is a cross-section of the clutch assembly taken along line 5-5 of FIG. 1 illustrating the clutch pack in a disengaged state.
Figure 6:
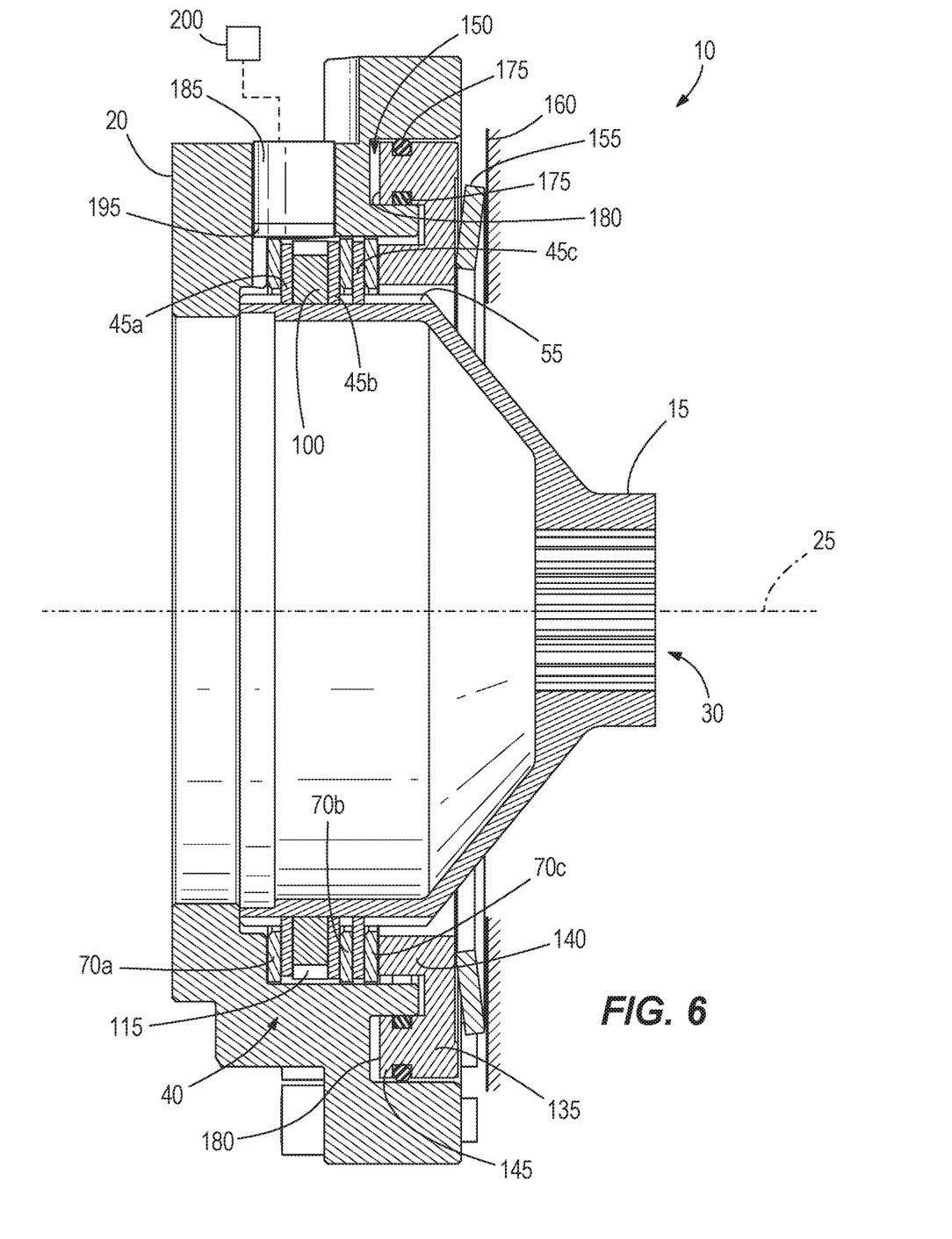
FIG. 6 is a cross-section of the clutch assembly taken along line 5-5 of FIG. 1 illustrating the clutch pack in an engaged state.

With reference back to FIGS. 2 and 3, the clutch assembly 10 also includes an end ring 135 coupled between the clutch pack 40 and the housing 20. In particular, the end ring 135 includes an inner flange 140 that interacts with the clutch pack 40 (e.g., engages the separator disk 70c; FIG. 6) and an outer flange 145 that is received within an annular recess 150 of the housing 20. A biasing member 155 (e.g., a disk spring) is positioned between the end ring 135 and the fixed structure 160 (e.g., the frame of the vehicle/mobile implement in which the housing 20 is attached; FIGS. 5 and 6) to bias the end ring 135 toward the housing 20 along the axis 25. In addition, the housing 20 includes a hydraulic fluid aperture 165 in communication with the annular recess 150 such that a hydraulic pump 170, which is coupled to the hydraulic fluid aperture 165, controls hydraulic fluid entering or exiting the annular recess 150. Gaskets 175 (e.g., O-rings, etc.) are coupled to the outer flange 145 to contact walls of the annular recess 150 (FIGS. 5 and 6) such that hydraulic fluid is maintained within a cavity defined between the annular recess 150 and a face 180 of the outer flange 145.

With reference to FIG. 3, the clutch assembly 10 further includes a sensor 185 received within a sensor aperture 190 of the housing 20 to be in communication with the speed sensor ring 100 of the clutch pack 40. The illustrated sensor 185 is a proximity sensor (e.g., a Hall effect sensor, a variable reluctance sensor, etc.) having a magnet 195 that generates a magnetic field, which interacts with the protrusions 115 of the speed sensor ring 100. In other embodiments, the sensor 185 can be an optical sensor (e.g., infrared, etc.), an acoustic sensor (e.g., ultrasonic, etc.), etc. In addition, the sensor 185 is in communication with a control processor 200 operable to monitor the interaction between the sensor 185 and the speed sensor ring 100. In some embodiments, the control processor 200 can also be in communication with the hydraulic pump 170 to control operation of the pump 170.

In operation, the clutch assembly 10 is movable between at least two states—a disengaged state (FIG. 5) and an engaged state (FIG. 6). When in the disengaged state, the control processor 200 operates the pump 170 to introduce hydraulic fluid within the annular recess 150 and apply enough hydraulic pressure on the face 180 of the end ring 135 to axially move the end ring 135 against the biasing force of the biasing member 155. Movement of the end ring 135 away from the housing 20 provides enough clearance for the clutch pack 40 to axially expand allowing the side surfaces 60, 90, 125 of the friction disks 45, the separator disks 70, and the speed sensor ring 100 to move out of contact with each other. Accordingly, the clutch pack 40 does not impede movement of the spindle 15 about the axis 25 relative to the housing 20 (e.g., the spindle 15, the friction disks 45, and the speed sensor ring 100 are freely rotatable about the axis 25 relative to the housing 20 and the separator disks 70). In the illustrated embodiment, the control processor 200 moves the clutch assembly 10 into the disengaged state when braking of the spindle 15—and ultimately the axle shaft 30—is not desired. In other words, the clutch pack 40 does not regulate movement of the spindle 15 when in the disengaged state.

When in the engaged state (FIG. 6), the control processor 200 operates the pump 170 to reduce the hydraulic pressure within the annular recess 150 allowing the biasing member 155 to push the end ring 135 toward the housing 20. In particular, the biasing member 155 applies pressure on the end ring 135 for the inner flange 140 to axially compress the clutch pack 40 such that the side surfaces 60, 90, 125 of the friction disks 45, the separator disks 70, and the speed sensor ring 100 to move into contact with each other. Accordingly, the clutch pack 40 obstructs movement of the spindle 15 about the axis 25 (e.g., frictional forces between the friction disks 45, the separator disks 70, and the speed sensor ring 100 are greater than when the clutch assembly 10 is in the disengaged state). In the illustrated embodiment, the control processor 200 moves the clutch assembly 10 into the engaged state when braking of the spindle 15—and ultimately the axle shaft 30—is desired. In other words, the clutch pack 40 regulates movement of the spindle 15 (e.g., brakes the spindle) when in the engaged state.

Moreover, the amount of braking applied by the clutch assembly 10 is dependent upon the hydraulic pressure within the annular recess 150 that acts against the biasing member 155 (e.g., maximum braking occurs when no hydraulic pressure is present within the annular recess 150 allowing the maximum force of the biasing member 155 to compress the clutch pack 40). In other embodiments, the biasing member 155 can be operable to bias the end ring 135 away from the housing 20 (e.g., the biasing member 155 can be positioned within the annular recess 150) and the hydraulic pressure from the pump 170 can be operable to move the end ring 135 toward the housing 20. Under this embodiment, maximum braking occurs when maximum hydraulic pressure is applied to the end ring 135, and no braking occurs when no hydraulic pressure is applied to the end ring 135.

The control processor 200 monitors an angular velocity of the spindle 15—and ultimately the axle shaft 30—via the interaction between the sensor 185 and the speed sensor ring 100. In particular, as the speed sensor ring 100 moves with the spindle 15 about the axis 25, the magnetic field generated by the magnet 195 interacts with the protrusions 115 of the speed sensor ring 100 and the control processor 200 determines the angular velocity of the spindle 15 based on the frequency of the interactions. For example, if the spindle 15 moves at a relatively low angular velocity, the frequency at which the magnetic field interacts with the protrusions 115 as each protrusion 115 moves past the sensor 185 will be relatively low. However, if the spindle 15 moves at a relatively high angular velocity, the frequency at which the magnetic field interacts with the protrusions 115 as each protrusion 115 moves past the sensor 185 will be relatively high. The control processor 200 is operable to determine the angular velocity of the spindle 15 while the clutch assembly 10 is within the disengaged or engaged states.

The third width 130 of the speed sensor ring 100 is greater than the first width 65 and/or the second width 95 to ensure the sensor 185 accurately interacts with the speed sensor ring 100. For example, the third width 130 is sized for the magnetic field to accurately interact with the protrusions 115 while the speed sensor ring 100 moves along the axis 25 relative to the sensor 185 when the clutch assembly 10 moves between the disengaged state and the engaged state. However, the speed sensor ring 100 does not provide direct torque transfer between the spindle 15 and the housing 20 unlike the direct torque transfer from the contact between adjacent friction disks 45 and separator disks 70. As such, the performance of the clutch assembly 10 decreases as the third width 130 increases. Therefore, as described above, the ratio of the third width 130 over the first width 65 or the ratio of the third width 130 over the second width 95 is between about 1.5 and about 10 to increase the performance of the clutch assembly 10 and to ensure an accurate measurement of the angular velocity of the spindle 15.

In other embodiments, the clutch assembly 10 can be used in other types of applications. For example, the clutch assembly 10 can be included within a transmission with the housing 20 and the spindle 15 rotatable about the axis 25. As such, the clutch pack 40 regulates an amount of torque transferred to the spindle 15 from the housing 20 or vice versa.

Although the disclosure has been described in detail with reference to certain preferred embodiments, variations and modifications exist within the scope and spirit of one or more independent aspects of the disclosure as described. Various features and advantages of the disclosure are set forth in the following claims.

The invention claimed is:

1. A clutch assembly comprising:
   a housing;
   a rotational member configured to rotate relative to the housing about an axis;
   a clutch pack coupled between the housing and the rotational member, the clutch pack including
      a separator disk coupled to the housing such that the separator disk is fixed from moving about the axis relative to the housing,
      a friction disk coupled to the rotational member such that the friction disk is configured to move with the rotational member about the axis, and
      a speed sensor ring coupled to the rotational member such that the speed sensor ring is configured to rotate with the rotational member about the axis; and
   a sensor coupled to the housing, the sensor in communication with the speed sensor ring and configured to measure an angular velocity of the rotational member relative to the housing;
   wherein the friction disk, the separator disk, and the speed sensor ring are configured to axially move along the axis to regulate movement of the rotational member relative to the housing.

2. The clutch assembly of claim 1, wherein an outer periphery of the speed sensor ring includes a plurality of protrusions, and wherein the sensor is configured to measure the angular velocity of the rotational member based on the plurality of protrusions moving relative to the sensor.

3. The clutch assembly of claim 2, wherein the sensor includes a magnet, and wherein the magnet is configured to generate a magnetic field that interacts with the plurality of protrusions for the sensor to measure the angular velocity of the rotational member.

4. The clutch assembly of claim 1, wherein the friction disk is a first friction disk, wherein the clutch pack includes a second friction disk coupled to the rotational member such that the second friction disk is configured to move with the rotational member about the axis, and wherein the speed sensor ring is positioned between the first and second friction disks such that the speed sensor ring is configured to be in selective contact with the first and second friction disks.

5. The clutch assembly of claim 1, wherein the separator disk is a first separator disk, wherein the clutch pack includes a second separator disk coupled to the housing such that the second separator disk is fixed from moving about the axis relative to the housing, and wherein the speed sensor ring is positioned between the first and second separator disks such that the speed sensor ring is configured to be in selective contact with the first and second separator disks.

6. The clutch assembly of claim 1, wherein the separator disk includes a first width parallel to the axis, wherein the speed sensor ring includes a second width parallel to the axis, and wherein a ratio of the second width over the first width is greater than 1.5.

7. The clutch assembly of claim 1, further comprising an end ring coupled between the housing and the clutch pack, wherein the end ring is configured to move along the axis by hydraulic pressure to compress a biasing member allowing the friction disk, the separator disk, and the speed sensor ring to axially move relative to each other.

8. A clutch assembly comprising:
a housing;
a rotational member configured to rotate relative to the housing about an axis;
a clutch pack coupled between the housing and the rotational member, the clutch pack configured to regulate movement of the rotational member relative to the housing, the clutch pack including
a speed sensor ring coupled to the rotational member such that the speed sensor ring is configured to rotate with the rotational member about the axis; and
a sensor in communication with the speed sensor ring, the sensor configured to measure an angular velocity of the rotational member relative to the housing.

9. The clutch assembly of claim 8, wherein an outer periphery of the speed sensor ring includes a plurality of protrusions, and wherein the sensor is configured to measure the angular velocity of the rotational member based on the plurality of protrusions moving relative to the sensor.

10. The clutch assembly of claim 9, wherein the sensor includes a magnet, and wherein the magnet is configured to generate a magnetic field that interacts with the plurality of protrusions for the sensor to measure the angular velocity of the rotational member.

11. The clutch assembly of claim 8, wherein the clutch pack includes a separator disk coupled to the housing such that the separator disk is fixed from moving about the axis relative to the housing, and wherein the clutch pack also includes a friction disk coupled to the rotational member such that the friction disk is configured to move with the rotational member about the axis.

12. The clutch assembly of claim 11, wherein the friction disk is a first friction disk, wherein the clutch pack includes a second friction disk coupled to the rotational member such that the second friction disk is configured to move with the rotational member about the axis, and wherein the speed sensor ring is positioned between the first and second friction disks such that the speed sensor ring is configured to be in selective contact with the first and second friction disks.

13. The clutch assembly of claim 11, wherein the separator disk is a first separator disk, wherein the clutch pack includes a second separator disk coupled to the housing such that the second separator disk is fixed from moving about the axis relative to the housing, and wherein the speed sensor ring is positioned between the first and second separator disks such that the speed sensor ring is configured to be in selective contact with the first and second separator disks.

14. The clutch assembly of claim 11, wherein the separator disk includes a first width parallel to the axis, wherein the speed sensor ring includes a second width parallel to the axis, and wherein a ratio of the second width over the first width is greater than 1.5.

15. The clutch assembly of claim 11, further comprising an end ring coupled between the housing and the clutch pack, wherein the end ring is configured to move along the axis by hydraulic pressure to compress a biasing member allowing the friction disk, the separator disk, and the speed sensor ring to axially move relative to each other.

16. A clutch assembly comprising:
a housing;
a rotational member configured to rotate relative to the housing about an axis;
a clutch pack coupled between the housing and the rotational member, the clutch pack including
a disk coupled to the housing, the disk including a first maximum width parallel to the axis, and
a speed sensor ring coupled to the rotational member such that the speed sensor ring is configured to rotate with the rotational member about the axis, the speed sensor ring including a second maximum width parallel to the axis; and
a sensor in communication with the speed sensor ring, the sensor configured to measure an angular velocity of the rotational member relative to the housing;
wherein a ratio of the second width over the first width is greater than 1.5.

17. The clutch assembly of claim 16, wherein the ratio of the second width over the first width is less than 10.

18. The clutch assembly of claim 16, wherein an outer periphery of the speed sensor ring includes a plurality of protrusions, and wherein the sensor is configured to measure the angular velocity of the rotational member based on the plurality of protrusions moving relative to the sensor.

19. The clutch assembly of claim 18, wherein the sensor includes a magnet, and wherein the magnet is configured to generate a magnetic field that interacts with the plurality of protrusions for the sensor to measure the angular velocity of the rotational member.

20. The clutch assembly of claim 16, wherein the disk is a separator disk coupled to the housing such that the separator disk is fixed from moving about the axis relative to the housing, wherein the clutch pack also includes a friction disk coupled to the rotational member such that the friction disk is configured to move with the rotational member about the axis, and wherein the speed sensor ring is configured to be in selective contact with one of the separator disk and the friction disk.

* * * * *